Patented Dec. 14, 1948

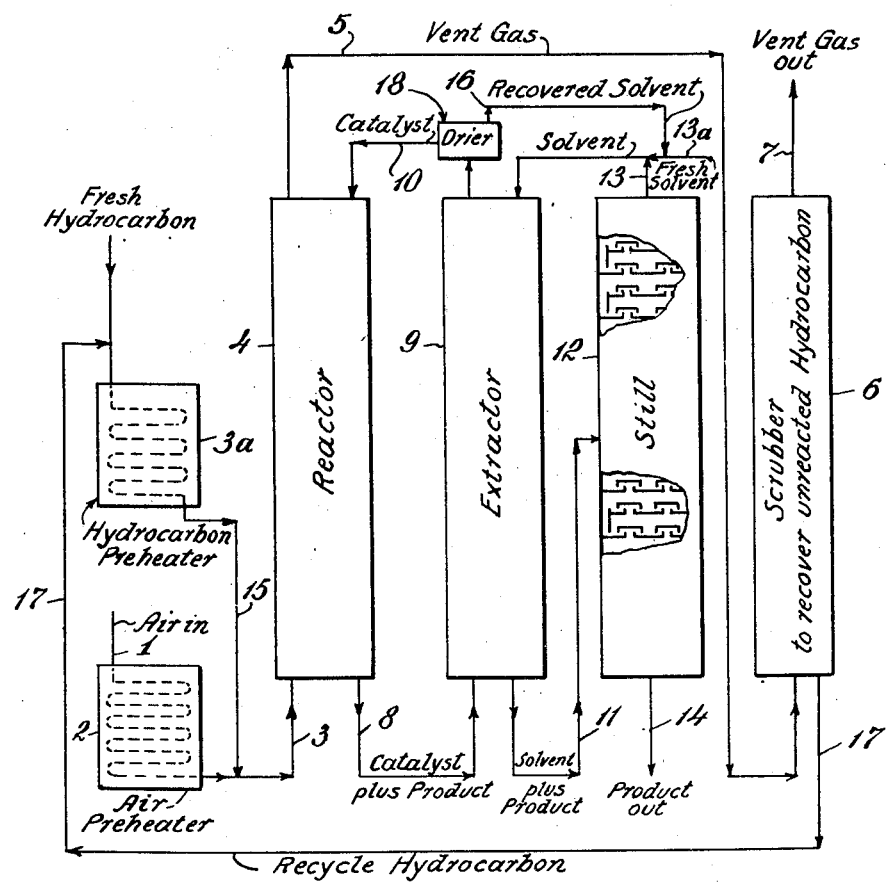

2,456,597

UNITED STATES PATENT OFFICE 2,456,597

PRODUCTION OF PHENOL BY CATALYTIC OXIDATION OF BENZENE

Carleton H. Schlesman, Camden, William I. Denton, Woodbury, and Richard B. Bishop, Pitman, N. J., assignors to Socony-Vacuum Oil Company, Incorporated, a corporation of New York Application September 9, 1944, Serial No. 553,350

10 Claims. (Cl. 260—621)

This invention relates to the oxidation of materials over a solid catalyst for the production of intermediate oxidation products and, more particularly, to a process for oxidizing benzene to phenol employing a solid catalyst.

Many processes of catalytic oxidation are known in which an aliphatic, alicyclic or aromatic hydrocarbon is oxidized to the corresponding acid. Thus, for example, benzene has been oxidized to maleic anhydride, naphthalene to phthalic anhydride and aliphatic hydrocarbons to aliphatic acids. However, it has been difficult to carry out catalytic oxidations to produce intermediate products such as phenols, alcohols or aldehydes. Thus, for example, J. M. Weiss and C. R. Downs, well-known authorities on catalytic oxidation made the following statement in Industrial and Engineering Chemistry, vol. 12, No. 3, page 229, concerning benzene:

"We reviewed the periodic system and determined to try every metal and metal oxide which would be stable under the conditions of the experiment, to determine which, if any, exerted catalytic action. We may say here that we completed this program and in addition tried many mixtures although of course, we could not exhaust all the possible permutations and combinations of materials and conditions. Wherever a trace of product was formed we went thoroughly into the various combinations with that particular catalyst in an attempt to enlarge the observations to commercial possibilities. In no case did we secure yields of phenol at all approaching anything commercial, although in the cases of a few catalysts we determined conversions of from 0.2 to 0.3 per cent."

Thus, these authorities found that it was impossible to stop the oxidation process at any point short of complete oxidation to maleic anhydride. In other words, the production of intermediate oxidation products was nil or so small as to make the catalytic oxidation of benzene to phenol unprofitable from a commercial viewpoint. The same situation has existed in the catalytic oxidation of other hydrocarbons.

Now, it has been discovered that these catalytic oxidation reactions can be controlled to produce the intermediate oxidation products in commercially attractive yields.

It is an object of the present invention to provide a process for producing intermediate oxidation products from hydrocarbons. It is another object of the present invention to provide a process for producing alcohols from aliphatic hydrocarbons, phenols from aromatic hydrocarbons and similar intermediate oxidation products by catalytic oxidation. It is a further object of the present invention to provide a process for producing oxidation products which are most highly adsorbed on the catalyst rather than oxidation products which are less highly adsorbed. Other objects and advantages will become apparent from the following description taken in conjunction with the drawing which is a more or less diagrammatic flowsheet of the process.

While the present process is illustrated by reference to the dipole moment of the starting material and the oxidation products derived therefrom, other criteria of electronic asymmetry could be used. That is to say, the adsorption of any organic compound by a catalyst bears a direct relationship to the electronic asymmetry and structure of that compound and the catalyst. This asymmetry is manifested in a number of different ways, for example, cis- and trans-forms of compounds, dipole moment, spectrum adsorption, etc. For reasons of simplicity the dipole moments of the starting material and the oxidation products have been used as the basis for selecting reactions which may be carried out in accordance with the principles of the present invention.

It is generally accepted that catalytic reactions are dependent upon adsorption by the catalyst of the material undergoing chemical reaction. Consequently, the more strongly a catalyst adsorbs a substance the more likely that substance is to be chemically changed. In other words, if the product of a first reaction is more strongly adsorbed by the catalyst than the starting material the first reaction product will be reacted preferentially as compared with the starting material. Thus, in a catalytic oxidation which occurs as a series of reactions in which the first reaction product is oxidized still further, the first reaction product is more strongly adsorbed by the catalyst than the starting material. It is generally considered that in the catalytic oxidation of benzene using solid catalyst, benzene is oxidized to the first reaction product or intermediate oxidation product, phenol, which in turn is oxidized to maleic acid or completely oxidized to oxides of carbon. The explanation for the preferential oxidation of phenol is believed to be due to the fact that the catalyst adsorbs phenol more strongly than benzene. That such preferential adsorption does occur is in agreement with the known fact that benzene has a dipole moment of zero while phenol has a dipole moment of $1.7 \times 10^{-18}$ and acids have a dipole moment of $0.8 \times 10^{-18}$. Thus, when phenol is oxidized to maleic acid, the acid is less strongly adsorbed and for this reason maleic acid is the chief product in the catalytic oxidation of benzene rather than phenol. However, by removing the intermediate oxidation product from the reaction zone substantially as rapidly as it is formed, the secondary reaction can be eliminated or greatly reduced. In general, the intermediate oxidation product can be removed by elutriating the solid catalyst after removal from the reaction zone or after reducing the temperature below that at which further oxidation takes place with a solvent for the intermediate product which may or may not be a solvent for the starting material. It is preferred, when possible, to remove the intermediate product by solution in the starting material. Thus in the catalytic oxidation of benzene to phenol, benzene in large excess is the preferred elutriant although water and alcohol or other solvents for phenol may be used.

The oxidation of benzene to phenol may be used as an illustration of the general proposition that intermediate oxidation products of a catalytic oxidation may be obtained by removing the catalyst and the intermediate oxidation product from the reaction zone substantially as rapidly as it is produced. Many catalysts have been employed including vanadium pentoxide ($V_2O_5$), molybdenum trioxide ($MoO_3$), ferric oxide ($Fe_2O_3$), chromic oxide ($Cr_2O_3$), tungsten trioxide ($WO_3$), aluminum phosphate ($AlPO_4$), vanadium dioxide ($V_2O_2$), etc. in this reaction but the best yield of phenol that has been reported in the literature is 0.3 per cent. On the other hand, as much as 1.9 per cent of the benzene charged has been converted to phenol by means of the present method.

Three main factors affect the yield of intermediate oxidation product, one is the temperature at which the reaction is carried out, the second is the residence time and third is pressure. Other things such as ratio of air to hydrocarbon are factors of lesser importance. As those skilled in the art know residence time is the interval during which the material undergoing reaction is in contact with the catalyst at the temperature of the reaction. The effect of these factors can be illustrated by batch reaction and for this reason the following results are reported as illustrative of the operation of this process as well as the effect of time, temperature and pressure.

A stainless steel bomb was employed and 156 grams fused vanadium pentoxide ($V_2O_5$) employed as the catalyst in each test. One gram of benzene was oxidized in each test with sufficient air to give an air to benzene molar ratio of 5:1. The bomb pressure at room temperature was about 310 pounds. The chief effect of pressure is on temperature. Thus at atmospheric pressure a comparatively high temperature would be required, at 300 pounds, temperatures of 700–800° F. may be used while at 1,000 to 2,000 pounds per square inch temperatures of 600–700° F. are operable. The bomb was heated to the temperatures and for the intervals of time indicated hereinafter. Thereafter the bomb was quenched and the catalyst extracted with a large volume of benzene. Quenching the bomb or lowering the temperature of the catalyst and adsorbed material is equivalent to removing the catalyst and adsorbed phenol from the reaction zone. The amount of phenol in the extract was determined and taken as a measure of the amount of benzene converted to phenol. The amount of phenol produced divided by the amount of benzene charged to the bomb is the conversion.

Table

| Test No. | Catalyst Temp., °F. | Reaction Time, Min. | Weight of Phenol / Weight of Benzene Chgd. |
|---|---|---|---|
| | | | Per cent |
| 1 | 600 | 60 | 0.8 |
| 2 | 650 | 30 | 1.0 |
| 3 | 800 | 4 | 1.9 |

It will be observed that as the temperature increases the residence time decreases and simultaneously the yield of phenol increases. In other words, the reaction can be carried out at temperatures above 600° F. with a residence time of sixty minutes or less. However, it is preferred to use temperatures 700–800° F. at 300 to 500 pounds per square inch and residence time of 5 minutes or less. Better results are obtained by decreasing the residence time as the reaction temperature is raised. It will also be noted that the catalyst is employed in excess. That is a high ratio of catalyst to starting material is used. It is preferred to use a catalyst to starting material ratio of about 200:1 to about 5:1 and particularly about 100 to about 10 to 1 by weight.

Continuous operation rather than batch operation is preferred and may be carried out in accordance with the broad principles illustrated by the drawing. In such continuous operation air, in not too great an excess, i. e. a ratio less than that employed to obtain products of a higher degree of oxidation, is charged through line 1 to air preheater 2. This air may be at atmospheric pressure or at superatmospheric pressure depending upon the particular oxidation reaction which is involved. Fresh feed may be preheated in the same or a different preheater 3a or may be heated with the air in the same coil in preheater 1. The preheated air is conducted through line 3 into reactor 4 where it is contacted with moving catalyst introduced into reactor 4 by means of conduit 10. When the material to be oxidized is preheated separately it is introduced into line 3 by conduit 15. When the catalyst is elutriated with the hydrocarbon to be oxidized for the purpose of removing the intermediate oxidation product the amount of fresh feed introduced from conduit 15 may be reduced considerably or eliminated entirely and added instead at 13a. Vent gas is removed from reactor 4 through line 5 and any unreacted feed entrapped in the vent gas is removed in scrubber 6, the scrubbed vent gas being released through vent line 7. The unreacted feed (recycle stock) removed in scrubber 6 is returned to the feed preheater by conduit 17. The catalyst with the adsorbed intermediate oxidation product, which is the desired product, is removed from reactor 4 through conduit 8 to extractor 9 where the intermediate oxidation product (desired product) is extracted with the starting material or any suitable solvent. When the starting material is used as the solvent for the product, the catalyst, wet with the starting material, is charged to the reactor through line 10. The amount of starting material may be varied as desired by charging additional material to be oxidized through line 15 or the catalyst may be partially dried in drier 18 intermediate to extractor 9 and reactor 4. If other than the starting material is used as a solvent, it will be necessary to dry the catalyst completely at this point, recovered solvent being returned through line 16 to line 13a where fresh solvent is added. The solvent containing the dissolved or suspended product is removed from extractor 9 by conduit 11 to still 12. In still 12 conditions preferably are maintained to vaporize the solvent and leave the product (intermediate oxidation product) as a still residue. The still residue or end product is removed from still 12 by means of line 14. The vaporized solvent is removed from the still and introduced into extractor 9 by means of conduit 13.

Since the application of the present method to other reactions involving the removal of intermediate reaction products involves only the skill of one versed in the art, further detailed illustrations are unnecessary. The reactions are carried out under conditions of temperature, pressure and oxidizing gas to starting material ratio established by the prior art. However, the ratio of catalyst to material to be oxidized is materially greater than heretofore employed. The reactions to which the principles of the present invention may be applied with the remarkable results illustrated hereinbefore are selected by a consideration of the dipole moments of the compounds involved. The present method may be used in all oxidation reactions over solid catalyst in which the dipole moment of the starting material is considerable less than the dipole moment of the intermediate oxidation product which is to be recovered. Thus, for example, naphthalene having a dipole moment of zero may be oxidized to produce naphthols having a dipole moment of $1.7 \times 10^{-18}$; toluene having a dipole moment practically zero may be oxidized to produce benzyl alcohol (dipole moment 1.7 to $1.8 \times 10^{-18}$) or to produce benzaldehyde (dipole moment $2.75 \times 10^{-18}$); aliphatic hydrocarbons such as butane having dipole moments essentially zero may be oxidized to produce the corresponding alcohols such as butanols, etc. having dipole moments of 1.7 to $1.8 \times 10^{-18}$ or to produce aldehydes having dipole moments of $2.5 \times 10^{-18}$. From the foregoing discussion and illustrations, those skilled in the art will understand that the scope of the present invention includes the production of intermediate oxidation products by catalytic oxidation over a solid catalyst employing a high ratio of catalyst to material to be oxidized (of the order of 100:1 to 2:1), customary temperatures, pressures and ratio of oxidizing gas, oxygen, air etc., to material to be oxidized and preferably short residence time. Those skilled in the art will also understand that the present invention is useful in carrying out catalytic oxidation reactions in which the desired product or intermediate oxidation product is more strongly adsorbed by the solid catalyst than the starting material. Those skilled in the art will understand that the end product of the present invention is the intermediate product of prior art process which existed for a short period of time but was not obtained as an end product in commercially attractive amounts by prior art methods involving oxidation in the presence of a solid catalyst. Those skilled in the art will understand that the success of the present invention may be dependent upon some characteristic other than the dipole moment but that the dipole moment is a simple means for determining to which reactions the principle of the present invention may be applied. It will also be understood that whether the dipole moment be the controlling factor or not this process will still remove the product most strongly adsorbed by the solid catalyst.

We claim:

1. A continuous catalytic vapor phase process for the production of phenol by oxidation of benzene in the presence of a solid porous adsorbent oxidation catalyst which comprises passing at an elevated temperature a mixture of benzene and air counter-current to a moving mass of solid porous adsorbent vanadium pentoxide catalyst, said catalyst mass moving at a rate such that it remains in the reaction zone at a temperature of at least 600° F. for a period of less than sixty minutes, conducting the catalyst containing adsorbed phenol into an extractor where a solvent for the phenol flows counter-current to the passage of catalyst through said extractor, removing solvent containing phenol from the extractor, fractionating the solvent-phenol solution into phenol and solvent to effect a solvent of sufficient purity for recycling to the extractor and a materially greater yield of phenol per pass of benzene through the continuous cycle substantially uncontaminated by secondary oxidation products as compared with that obtained with other continuous catalytic vapor phase oxidation processes.

2. A continuous catalytic vapor phase process for the production of phenol by oxidation of benzene in the presence of a solid porous adsorbent oxidation catalyst which comprises passing at an elevated temperature a mixture of benzene and air counter-current to a moving mass of solid porous adsorbent vanadium pentoxide catalyst, said catalyst mass moving at a rate such that it remains in the reaction zone at a temperature of at least 600° F. for a period of less than sixty minutes, conducting the catalyst containing adsorbed phenol into an extractor where a benzene solvent flows counter-current to the passage of catalyst therethrough extracting phenol from said catalyst, removing benzene solvent containing phenol from the extractor, fractionating the benzene-phenol mixture to effect a separation thereof, recycling the separated benzene to the extractor and obtaining, as a residue of said fractionation, substantially pure phenol.

3. A process for producing phenol by catalytic vapor phase oxidation of benzene, comprising contacting, at an elevated temperature, a mixture of benzene vapor and oxygen-containing oxidizing gas with a moving mass of solid porous adsorbent metal oxide catalyst suitable for promoting the conversion of benzene to phenol, said catalyst mass moving through a reaction zone maintained at a temperature of at least 600° F. at such a rate that phenol produced in said zone is removed therefrom substantially as rapidly as it is formed by adsorption on said moving catalyst mass, bringing the catalyst containing adsorbed phenol in contact with a solvent for phenol, separating the resulting solution from said catalyst and thereafter separating phenol from said solvent to yield a product of phenol substantially uncontaminated by other oxidation products of benzene.

4. A process for producing phenol by catalytic vapor phase oxidation of benzene, comprising contacting, at a temperature of at least 600° F. and for a relatively short period of time, a mixture of benzene vapor and oxygen-containing oxidizing gas with a solid porous adsorbent vanadium pentoxide catalyst, removing the catalyst containing adsorbed phenol from the reaction zone before substantial amounts of phenol have been further oxidized, elutriating the catalyst with a solvent for phenol, separating the resulting solution from said catalyst and thereafter separating phenol from said solvent to effect a materially improved yield of phenol substantially uncontaminated by other benzene oxidation products.

5. A process for producing phenol by catalytic vapor phase oxidation of benzene, comprising contacting, at an elevated temperature, a mixture of benzene vapor and oxygen-containing oxidizing gas with a solid porous adsorbent metal oxide catalyst suitable for promoting the conversion of benzene to phenol, said contact being made at a temperature greater than 600° F. for a period of less than 60 minutes, removing the catalyst containing adsorbed phenol from the reaction zone, elutriating the catalyst with a solvent for phenol, separating the resulting solution from said catalyst and thereafter separating phenol from said solvent to effect a materially improved yield of phenol substantially uncontaminated by other benzene oxidation products.

6. A process for producing phenol by catalytic vapor phase oxidation of benzene, comprising contacting, at an elevated temperature, a mixture of benzene vapor and oxygen-containing oxidizing gas with a solid porous adsorbent metal oxide catalyst suitable for promoting the conversion of benzene to phenol, said contact being made at a temperature of about 700° F. to about 800° F. and a pressure of about 300–500 pounds per square inch for a period of less than 5 minutes, removing the catalyst containing adsorbed phenol from the reaction zone, elutriating the catalyst with a solvent for phenol, separating the resulting solution from said catalyst and thereafter separating phenol from said solvent to effect a materially improved yield of phenol substantially uncontaminated by other benzene oxidation products.

7. A process for producing phenol by catalytic vapor phase oxidation of benzene, comprising mixing air and benzene vapor in the ratio of about 5:1, bringing the resulting mixture in contact with at least about 5 times by weight as much solid porous adsorbent metal oxide catalyst as benzene, said contact being made at a temperature of about 700° F. to about 800° F. and a pressure of about 300–500 pounds per square inch for a period of less than 5 minutes, removing the catalyst containing adsorbed phenol from the reaction zone, elutriating the catalyst with a solvent for phenol, separating the resulting solution from said catalyst and thereafter separating phenol from said solvent to effect a materially improved yield of phenol substantially uncontaminated by other benzene oxidation products.

8. A continuous catalytic vapor phase process for the production of phenol by oxidation of benzene in the presence of a solid porous adsorbent metal oxide catalyst suitable for promoting the conversion of benzene to phenol, which comprises contacting, at an elevated temperature, a mixture of benzene and oxygen-containing oxidizing gas with a mass of said catalyst moving through a reaction zone maintained at a temperature of at least 600° F. at such a rate that phenol produced in said zone is removed therefrom substantially as rapidly as it is formed by adsorption on said moving catalyst mass, bringing the catalyst containing adsorbed phenol into contact with a solvent for the phenol, separating the resulting solvent-phenol solution into phenol and solvent to effect a solvent of sufficient purity for recycling and a material yield of phenol per pass of benzene through the continuous cycle, substantially uncontaminated by other benzene oxidation products.

9. A continuous catalytic vapor phase process for the production of phenol by oxidation of benzene, which comprises contacting, at an elevated temperature, a mixture of benzene and air with a moving mass of solid porous adsorbent metal oxide catalyst suitable for promoting the conversion of benzene to phenol, said catalyst mass moving at such a rate that it remains in the reaction zone at a temperature of at least 600° F. for a period of less than 60 minutes, conducting the catalyst containing adsorbed phenol into an extractor containing a solvent for the phenol, removing solvent containing phenol from the extractor, fractionating the solvent-phenol solution into phenol and solvent to effect a solvent of sufficient purity for recycling to the extractor and a material yield of phenol per pass of benzene through the continuous cycle, substantially uncontaminated by other benzene oxidation products.

10. A continuous catalytic vapor phase process for the production of phenol by oxidation of benzene in the presence of a solid porous adsorbent oxidation catalyst, which comprises contacting, at an elevated temperature, a mixture of benzene and oxygen-containing oxidizing gas with a moving mass of solid porous adsorbent vanadium pentoxide catalyst, said catalyst moving through a reaction zone maintained at a temperature of at least 600° F. at such a rate that phenol produced in said zone is removed therefrom substantially as rapidly as it is formed by adsorption on said moving catalyst mass, elutriating the catalyst after removal from said zone with a solvent for phenol, separating the resulting solution from said catalyst, fractionating the solvent-phenol solution into phenol and solvent to effect a solvent of sufficient purity for recycling and a materially greater yield of phenol per pass of benzene through the continuous cycle, substantially uncontaminated by secondary oxidation products as compared with that obtained with other continuous catalytic vapor phase processes.

CARLETON H. SCHLESMAN.
WILLIAM I. DENTON.
RICHARD B. BISHOP.

REFERENCES CITED

The following references are of record in the file of this patent:

UNITED STATES PATENTS

| Number | Name | Date |
| --- | --- | --- |
| 1,595,299 | Hale | Aug. 10, 1926 |
| 2,199,585 | Bone | May 7, 1940 |
| 2,223,383 | Moyer | Dec. 3, 1940 |
| 2,328,920 | Moyer | Sept. 7, 1943 |

FOREIGN PATENTS

| Number | Country | Date |
| --- | --- | --- |
| 439,356 | Great Britain | Dec. 2, 1935 |